Nov. 24, 1931.  E. K. NORTON  1,833,850
DEPTH GAUGE
Original Filed May 11, 1925   4 Sheets-Sheet 1
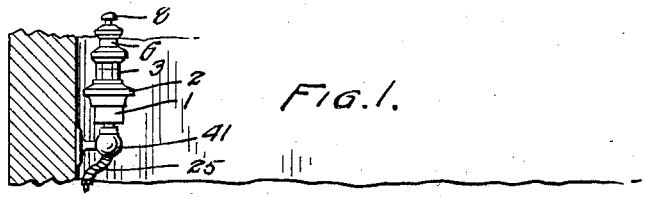
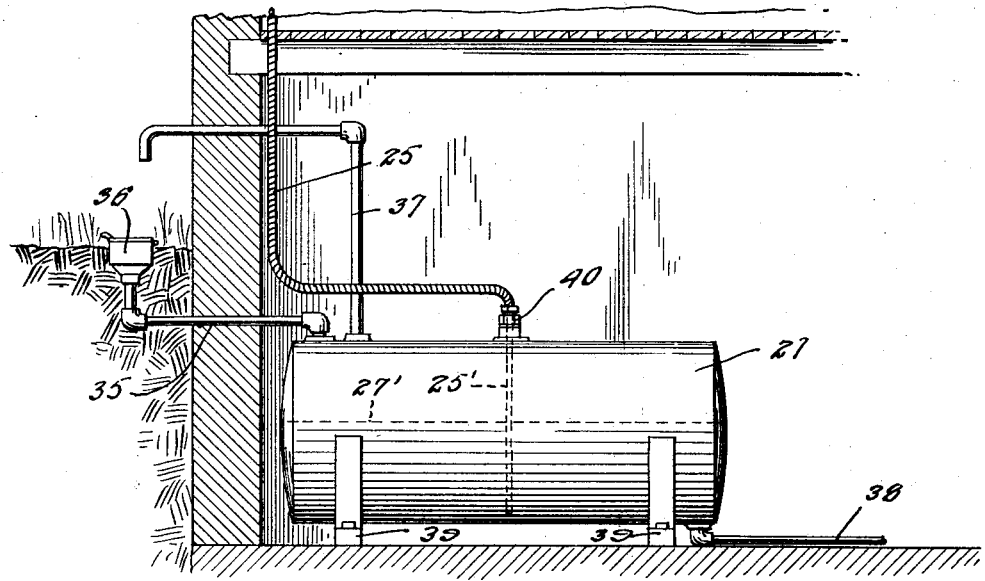
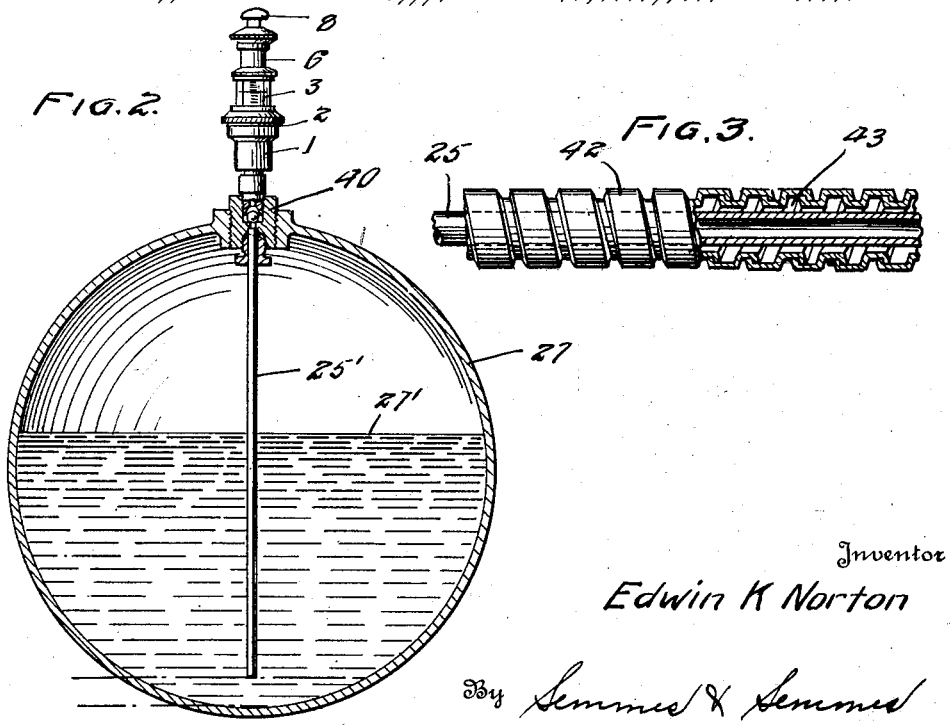
Inventor
Edwin K Norton
By Semmes & Semmes
Attorneys

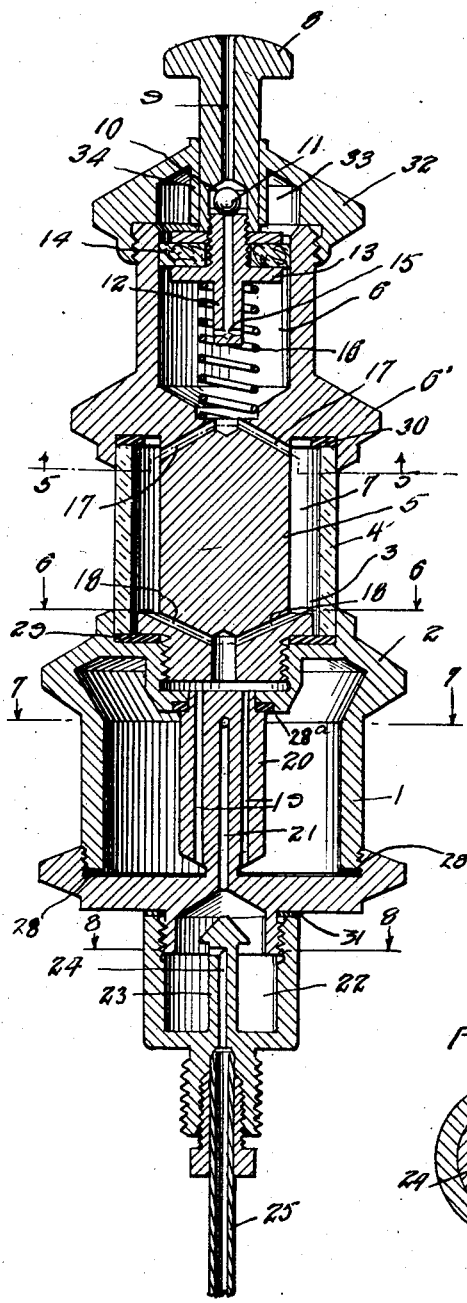
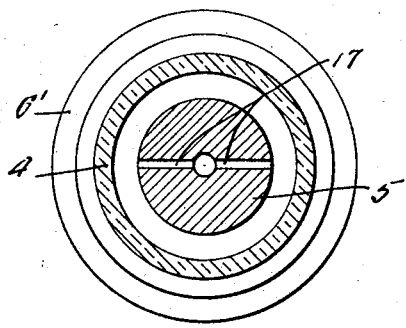
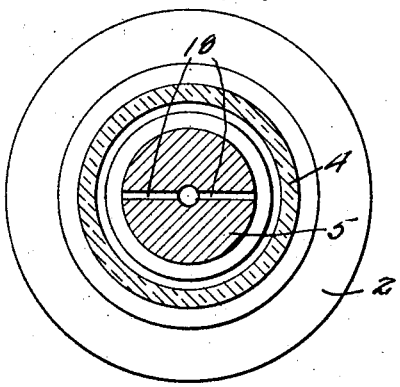
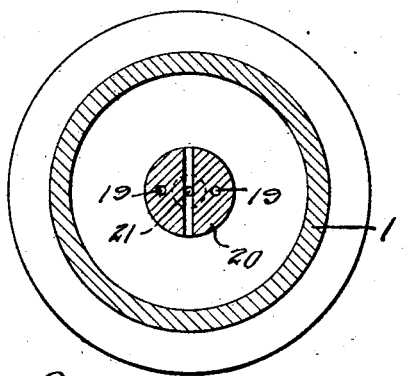
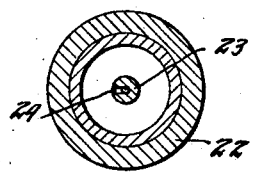

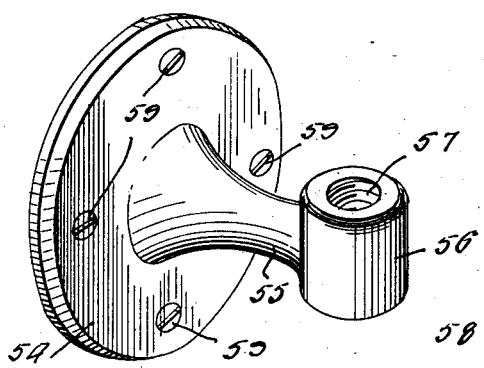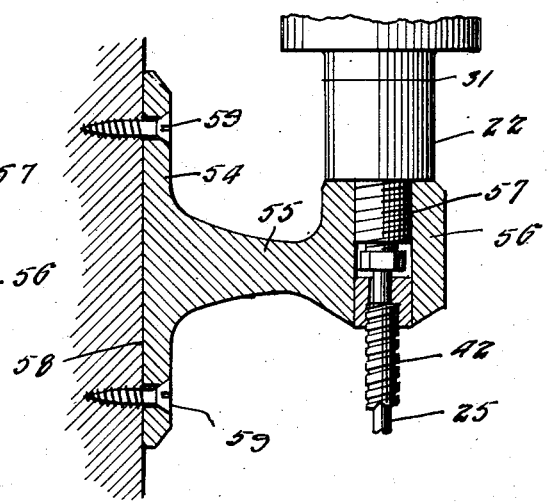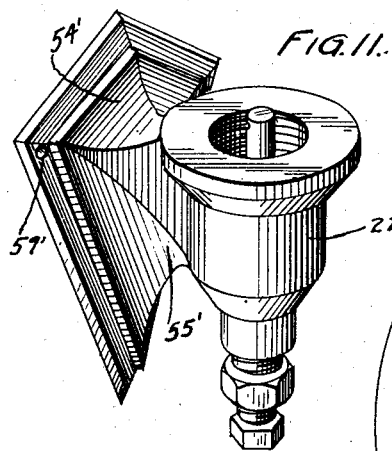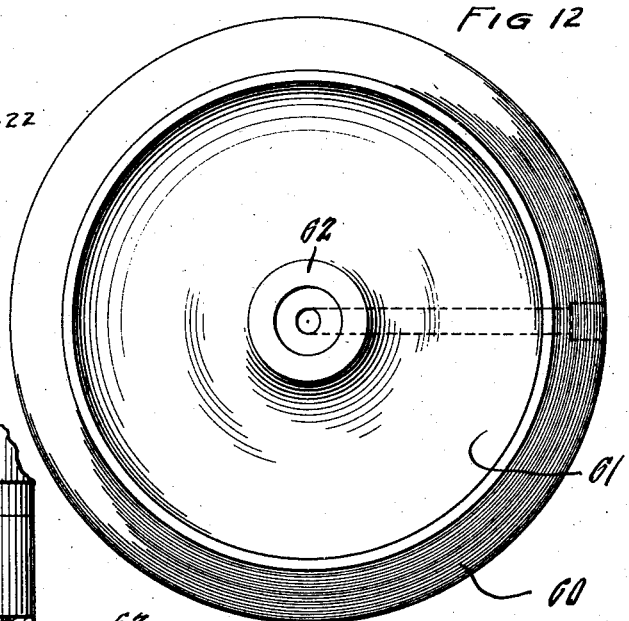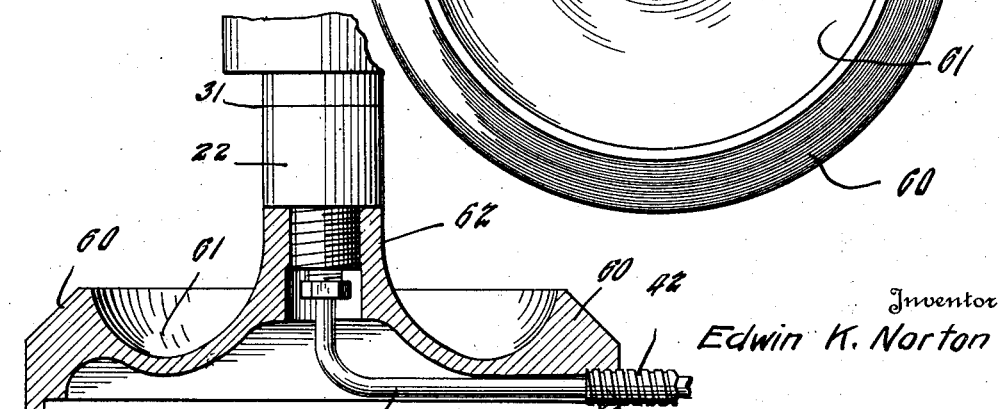

Nov. 24, 1931.　　　E. K. NORTON　　　1,833,850
DEPTH GAUGE
Original Filed May 11, 1925　　4 Sheets-Sheet 4
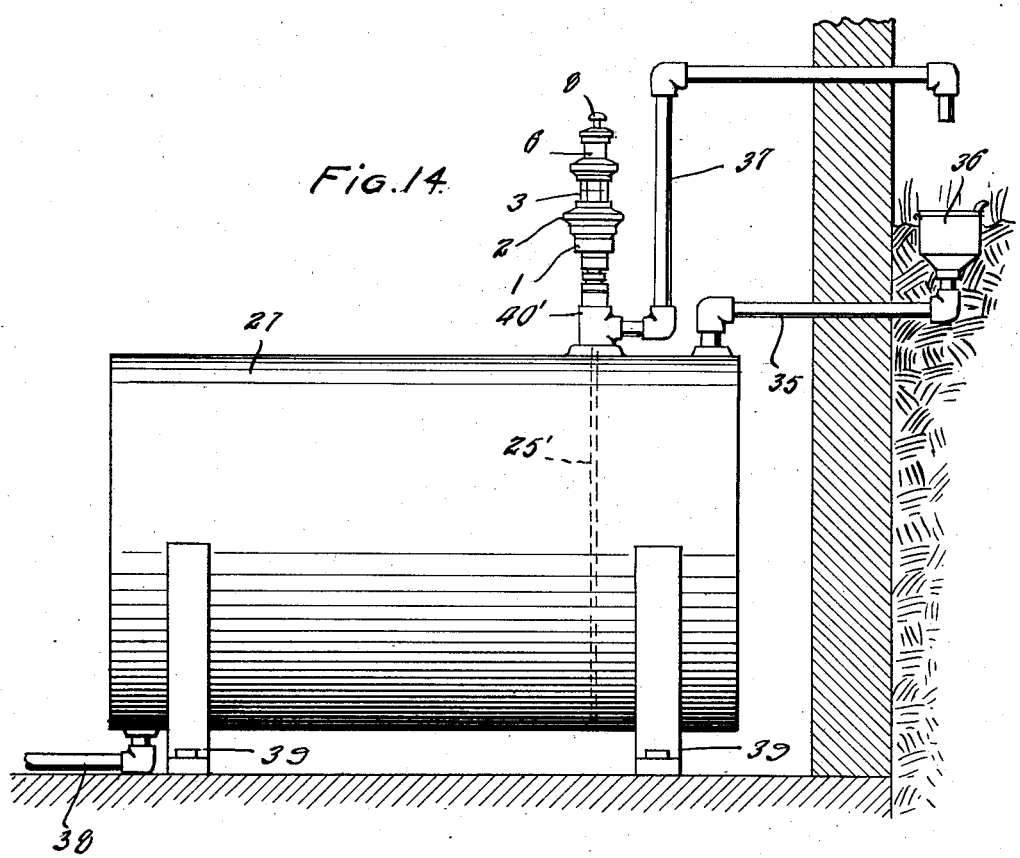
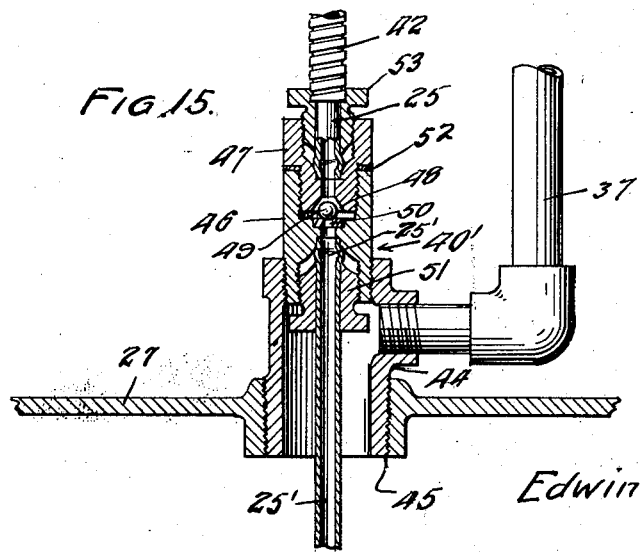
Inventor
Edwin K. Norton
By Semmes & Semmes
Attorneys Patented Nov. 24, 1931

1,833,850

UNITED STATES PATENT OFFICE

EDWIN K. NORTON, OF BROOKLYN, NEW YORK, ASSIGNOR TO NORTON GAUGE COMPANY, A CORPORATION OF CONNECTICUT

DEPTH GAUGE

Application filed May 11, 1925, Serial No. 29,540. Renewed September 8, 1931.

My invention relates to liquid level indicating devices, and more particularly to the class of liquid level indicators which operate upon a hydrostatic principle.

An object of my invention is to provide an indicating device which may be attached directly to a fluid storage reservoir or may be located at a considerable distance from the reservoir.

Another object of my invention is to provide a connecting means between the indicating device and the storage reservoir when the indicator is located at a distance from the reservoir.

Yet another object of the invention is to provide a mounting for the indicator by means of which the indicator may be attached to a suitable support.

A further object of my invention is to provide a liquid level indicating device operating upon a hydrostatic principle, with means to obtain a true hydrostatic balance.

A still further object of my invention is to provide a connecting means between the indicator and the storage reservoir whereby oil gases generated within the reservoir are prevented from passing out through the indicator.

My device is particularly adaptable to fluids such as oil, gasoline, liquid soaps, acids of light specific gravity, brines, and in fact, where it is necessary to measure any liquid either applying the device directly to the container, or by placing the indicator at a considerable distance from the container for purposes of convenience, such as reservoirs of fuel oil submerged in the ground at a distance from a residence or factory, for oil storage gasoline tanks on automobiles where it is desirable to have the indicator on the dash and many similar applications.

In the particular class of indicating devices operating on the hydrostatic principle, I have found in the past that such devices were limited in their scope of operation, due to several mechanical defects in construction, one especially being the fact that the level indicating means being a liquid, the problem of installation is a serious one, since sealing caps are necessary to prevent the indicating fluid from being spilled during shipment and installation. The usual devices employ essentially the U-tube principle comprising a storage chamber, a connecting conduit, and a small diameter indicating column which is open to the atmosphere, the storage chamber being connected by means of a tube to the chamber which is inserted in the fluid to be measured.

My invention aims to provide an improved means of indication in order to eliminate the various faults in construction and operation of similar devices which have been disclosed. Specifically the elements for the successful operation of an indicating device operating on the hydrostatic principle are as follows:

A tube or pipe which is inserted in the receptacle or reservoir of the fluid to be measured and connected thereto; a tube which is attached to the end of the pipe and to the indicator, and a storage chamber containing a fluid of greater specific gravity than the fluid to be measured in the reservoir so that a differential specific gravity of at least three to one is obtained.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

Figure 1 is a vertical sectional view through a portion of a house showing the placement of the gauge;

Fig. 2 is a vertical cross sectional view of a tank showing the gauge attached directly thereto;

Fig. 3 is a side elevation partly in vertical longitudinal section of a portion of the connecting tube;

Fig. 4 is a vertical longitudinal section of the gauge;

Fig. 5 is a horizontal section on line 5—5 of Fig. 4;

Fig. 6 is a horizontal section on line 6—6 of Fig. 4;

Fig. 7 is a horizontal section on line 7—7 of Fig. 4;

Fig. 8 is a horizontal section on line 8—8 of Fig. 4;

Fig. 9 is a perspective view of one form of mounting bracket;

Fig. 10 is a vertical transverse section of the mounting bracket;

Fig. 11 is a perspective view showing another form of mounting for the indicating device;

Fig. 12 is a plan view of a table mounting support for the gauge;

Fig. 13 is a vertical transverse section of the table mounting;

Fig. 14 is a side elevation of the gauge attached to the vent pipe of a tank; and Fig. 15 is a vertical longitudinal section of a check valve and air vent unit.

Referring to Figs. 1, 2 and 4 of the drawings, and more particularly to Fig. 4, I have shown my liquid level indicating device comprising a storage chamber 1, adapted to receive a pressure indicating liquid, which is integral with the base 2 of an indicating chamber 3. The base 2 is provided with suitable recesses to receive the indicating chamber 3, which consists of a hollow glass or bakelite tube 4 of relatively large diameter, and a central column 5. It is desirable to have the tube 4 formed of material which is not easily broken or susceptible to changes in temperature. I have found that bakelite makes an excellent material for the housing or tube 4.

Superimposed on the indicating chamber 3 is an expansion chamber 6 having a base 6' to which is attached the central column 5. The expansion chamber and the central column 5 form a unit which is inserted concentrically into the indicating chamber in order to reduce the volume of the indicating fluid contained in the space 7 surrounding the column 5 and at the same time to give a large diameter on the indicating chamber.

The stem 8 of the expansion chamber unit is provided with a passage 9 which connects the stem to a small chamber 10 containing a ball 11 of relatively light specific gravity which acts as a check valve in the operation of the stem. Attached to the stem 8 is a plunger 12 having a circular shoulder extension 13 and a washer 14 between the plunger and the casing of the expansion chamber. The lower extremity of the plunger 12 is provided with an opening 15 which connects directly to the stem 8 and the chamber containing the ball 11. Between the circular flange member 13 and the bottom of the expansion chamber is a spring 16 which holds the entire stem and plunger unit in its highest position when not in use.

In the central column 5 I have provided a plurality of restrictive connecting passages 17 and 18 which connect with passages 19 in a central concentric column 20 formed integral with the cap or cover 2 of the storage chamber 1. The central concentric column 20 is provided with a central air passage 21 which connects the storage chamber 1 with an overflow reservoir 22. The reservoir 22 is also provided with a central concentric column 23 within which is located an air passage 24 which connects directly to a tube 25. The tube 25 connects the indicator with the tank 27, as shown in Fig. 1, or the indicator may be attached directly to the tank, as indicated in Figure 2.

The chamber 1 is suitably sealed at the base by gaskets 28 and 28a; the indicating reservoir is sealed with gaskets 29 and 30; and a gasket 31 is also provided for the reservoir 22, thereby preventing leakage of the air or fluid at all times. The purpose of the reservoir 22 is to provide a means of preventing any fluid in the storage chamber from passing out through the air passage 21 and into the tube 25 either during shipment of the instrument or during its installation or operation.

It will be readily seen that any small quantity which might possibly leak out in this manner will be caught in the reservoir 22 and prevented from entering the air passage 24. However, the construction of the chamber 1 is such that there is very slight possibility of any liquid passing from the air passage 21, inasmuch as the capacity of the storage chamber in any position, whether upright, horizontal, or inverted, prevents the fluid from reaching the opening in the central column which connects the reservoir to the air passage 21.

In this construction it is not necessary to provide the instrument with any sealing caps at the ends to prevent the fluid from escaping from the storage chamber, either from the bottom or out through the indicating chamber or the expansion chamber. It will be noted that in the expansion chamber 6, the lower part of the stem 8 is in the form of a concentric column so that even though fluid escapes into the expansion chamber from the indicating chamber during transit or installation, a large quantity can be retained in the expansion chamber in an inverted position without escaping from the indicator.

It will also be noted that the cap 32 of the expansion chamber is provided with a recess 33 in its upper portion and a concentric bearing 34 for the stem 8. This recess in the cap 32 also further prevents any liquid from escaping should it pass the plunger 12, by leakage.

Referring to Fig. 1, I have shown my liquid level indicating device located at some distance from the tank or container 27. In this particular arrangement the storage tank is placed in a basement and is provided with a suitable filling means comprising a pipe 35 which connects with a funnel means 36 substantially flush with the ground.

The tank is further provided with a vent pipe 37 and a drain pipe 38, and support members 39 are used to maintain the tank in an upright position. The tubing 25 is attached to the tank by a suitable fastening means 40, and connects with the level indicating device, which is located in a room above the basement, with a pipe or tube 25' which extends into the reservoir. A support member 41 provides means for mounting the indicating device upon a wall or other suitable location.

Referring to Fig. 3, I have shown a detailed view of the connecting tube 25. The tube has a flexible armor covering 42, and between the tube and the armor covering is inserted a layer of asbestos 43 which surrounds the tube. The purpose of this flexible metal conduit is for the protection of the tube wire 25, especially when the wire is installed underground, but it also serves in any case as a protection to the tube both from damage by pinching through unnecessary sharp bends, and also to prevent sudden temperature changes from affecting the air contained under pressure in the hollow wire. This flexible metal conduit protection will have a tendency to permit the indicator to function with less inaccuracies than when installed without such a protector, and also facilitates the installation of the indicating device.

I have found that considerable difficulty has arisen when an instrument of the type described is installed particularly on oil reservoirs, due to the fact that when the reservoir is being filled, and especially when it is filled too rapidly, the air confined within the reservoir is not eliminated rapidly enough through the vent to the atmosphere, and in consequence, a pressure is set up within the indicator, causing the indicating fluid to rise rapidly and become ejected through the tube and thus become lost.

Referring to Fig. 14, I have shown my liquid level indicating device connected directly to the storage tank 27 through a check valve and air vent unit 40'.

In Fig. 15, I have shown a detailed view of the check valve and air vent unit 40' which consists of a T-pipe connection 44 attached to the tank 27 by suitable screw means 45 and adapted to receive the vent pipe 37. Above the vent pipe connection is a sleeve member 46 which screws into the T-pipe connection 44 and receives a threaded member 47 which is provided with a recess 48 in which is placed a check ball 49, the purpose of the check ball being to seal the passage 50 between the connecting tube 25 and the reservoir tube 25'. A lock nut 51 connects the reservoir tube 25' with the sleeve member 46, and a suitable gasket 52 is provided between the members 46 and 47. The connecting tube 25, having a flexible armor covering 42, is connected to the member 47 by means of a lock nut 53.

In this check valve vent pipe combination, as shown in Fig. 15, it will be readily seen that when any undue pressure is generated within the fluid reservoir, which is not relieved through the vent pipe 37 to the atmosphere, and a pressure is set up within the reservoir tube 25', the check ball 49 will suddenly rise and seat itself against the upper part of the check valve unit, thereby preventing any pressure from reaching the indicator itself. As soon as this pressure has been relieved through the vent pipe 37, the ball will drop back to its normal position, thereby allowing a free circulation of normal hydrostatic pressure from the reservoir to the indicator. The check valve and vent pipe combination complies with all fire underwriters specifications for oil gauges, particularly in the oil burning equipment units, and makes it most desirable as a fluid indicator for the purposes mentioned, particularly as it eliminates any possibility of oil fumes which are generated within the oil reservoir from passing out through the indicator, thus adding to any conflagration which may have started through any cause whatever.

Referring to Figs. 9 and 10, I have shown a mounting for my indicator comprising a circular base 54 having an arm extension 55 formed with a cylindrical member 56, which is provided with an opening 57 adapted to receive a threaded shoulder extension attached to the overflow reservoir 22 of the liquid level indicator. The mounting is fastened to a wall or other support 58 by suitable screw means 59.

Referring to Fig. 11, I have shown a mounting for the indicator in which the overflow reservoir 22 is formed integral with a supporting bracket having an ornamental base member 54' with an arm portion 55'. This form of bracket provides a substantial mounting means for the indicator which may be attached to a wall or other support member by screw means 59'.

In Figs. 12 and 13 I have shown another form of mounting or support for my indicator. This particular type may be used to support the indicator on a table or desk. It consists of a circular base 60 provided with a curved portion 61 and a concentric vertical member 62. The vertical member 62 is adapted to receive a threaded shoulder extension attached to the overflow reservoir 22 of the indicator. A suitable opening is provided in the base 60 to permit the connecting tube 25, which connects the indicator and the storage reservoir, to be inserted.

The operation of my indicating device is as follows: When the indicator, the tank tube and the connecting tube are installed in a suitable reservoir and the reservoir gradually filled with fluid, either oil, gasoline or the like, a pressure will be created in the tube which is immersed in the fluid. This pressure will be transmitted directly through the connecting tube into the storage chamber 1, up through the air passage 21. This will immediately create a downward pressure on the indicating fluid in the storage chamber. The fluid will then be forced upward through the plurality of passages 19, through the passages 18 and into the indicating chamber 3. The level of the indicating fluid will then be in direct proportion in miniature in the indicating chamber to correspond to the level of the fluid to be measured in the reservoir, due to the fact that the indicating fluid and the fluid in the reservoir to be measured are in hydrostatic balance. It will be understood that in order to have the indicator show a full reading when the reservoir containing the fluid to be measured is full, the diameters of the reservoir tube and the indicating reservoirs must be relatively predetermined, which is simply volumetric displacement.

There are two causes of inaccuracy in the employment of the simple hydrostatic principle indicating fluid depths, namely, changes in the temperature which cause the air which is confined in the hollow wire to either expand or contract, thereby changing the hydrostatic balance, or by leakage in any of the connections of the hollow wire or parts of the indicator. In order to overcome these inaccuracies which might occur from time to time, I have provided within the expansion chamber a stem and plunger mechanism, as shown in Fig. 4.

It will be readily seen that when manual pressure is applied downwardly to the upper portion of the stem, the volume of air which is contained within the expansion chamber will be forced through the air passages 17 into the indicating chamber 3, thereby forcing the indicating fluid downward through the passages 18 and into the storage chamber 1. The ball 10 located within the stem 8 adds materially to the operation of this stem and plunger, inasmuch as it permits the free passage of air when in normal position throughout the entire length of the stem, as it leaves the indicating chamber open to the atmosphere at all times, but temporarily seals the air passage 9 in the stem 8 when manual pressure is applied in a downward direction, and when in an inverted position during shipment.

The air thus forced out through the indicating chamber 3 into the storage chamber 1 passes through the air passage 21 located in the concentric stem 20 of the chamber 1 and replaces any air which has leaked out and any surplus air not needed to reinstate the true hydrostatic balance, passes out through the bottom of the reservoir tube into the reservoir. By this means, an almost instant rectification of the reading may be obtained.

It is well known that the indicator is primarily a depth indicating means, and is not associated with volumetric indication, inasmuch as the pressure required to raise the indicating fluid from the storage chamber to the indicating chamber is only a question of lineal submersion of the tube in the reservoir of fluid to be measured. The reservoir can be of large capacity or small capacity with the same depth and the indicator will measure both equally. However, should the indicator be required to measure volumetrically, it will be readily seen that the concentric central column in the indicating chamber 3 can be inscribed with graduations suitably calibrated to the shape of the container so that the volumetric indication can be obtained in gallons or any unit of measurement desired.

The construction of the indicating chamber with a relatively large diameter to the storage chamber containing the central solid column for the purpose of reducing the volume of indicating fluid necessary, and at the same time reducing the height of the indicating column, provides a construction which reduces the size of the indicator for the larger reservoirs containing fluids to be measured.

All devices of this character have employed an indicating chamber of much smaller diameter than the storage chamber so that the indication of sixty inches of fluid in a reservoir would be indicated in the indicating column in about twelve inches. One purpose of my invention is to provide an indicator that will give reference of depths from two to twenty feet and maintain a much smaller indicating means for the sake of compactness and to provide a simpler construction for the manufacture of the indicator.

Furthermore, I have employed a construction which is concentric throughout, that is, the storage chamber is a concentric unit; the connecting means is a concentric unit within the storage chamber; and the indicating chamber is superimposed concentrically thereon. I also provide a plurality of connecting means in this concentric connecting unit so that the indicating fluid will have free and easy access to the indicating chamber without restriction.

The device also includes an expansion chamber superimposed concentrically upon the indicating chamber to receive any surplus indicating fluid which may rise in the indicating chamber due to sudden pressures or over-submersion of the measuring tube in any reservoir. This chamber is so arranged as to prevent the indicating fluid from escaping and thus becoming lost from the indicator.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention or exceeding the scope of the appended claims.

I claim:

1. A liquid level indicating device comprising a storage chamber, an indicating chamber mounted co-axially upon the storage chamber, an expansion chamber mounted co-axially upon the indicating chamber, and means providing for the transmission of fluid under pressure from one chamber to another in either direction.

2. A liquid level indicating device comprising a storage chamber, an indicating chamber mounted co-axially upon the storage chamber, an expansion chamber mounted co-axially upon the indicating chamber, the indicating chamber being provided with restrictive apertures communicating with the storage and expansion chambers.

3. A liquid level indicating device comprising a storage chamber, an indicating chamber mounted upon and communicating with the storage chamber, an expansion chamber mounted upon and communicating with the indicating chamber, said storage and expansion chambers communicating with different sources of fluid under pressure.

4. A device of the class described comprising a storage chamber communicating at one end with a source of pressure, an indicating chamber mounted co-axially upon the storage chamber and communicating therewith, an expansion chamber mounted upon the indicating chamber and provided with a plunger mechanism, whereby air may be forced from the expansion chamber through the indicating and storage chambers.

5. A liquid level indicating device comprising a storage chamber, an overflow trap at the base thereof, an indicating chamber mounted co-axially upon the storage chamber and in direct communication therewith through a passageway expansion chamber mounted co-axially upon the indicating chamber and communicating with the latter through a passageway, and a plunger mechanism mounted in said expansion chamber for the purpose described.

6. A liquid level indicating device comprising a storage chamber formed with a centrally apertured extension an overflow trap secured to the base of the storage chamber and communicating with it through the aperture in said extension.

7. A liquid level indicating device comprising a storage chamber adapted to contain a body of liquid, a central column within the storage chamber formed with two series of passages, an overflow trap secured to the base of the storage chamber and communicating with one of the series of passages, and an indicating chamber mounted co-axially upon the storage chamber and communicating with the other of said series.

8. A liquid level indicating device comprising a storage chamber having a cylindrical shaped overflow trap attached thereto, the trap having an external cylindrical shoulder extension, and an internal hollow rod member formed co-axial and integral with its base and communicating with the said shoulder extension and the interior of the trap, and an indicating chamber mounted upon and communicating with the storage chamber.

9. A liquid level indicating device comprising a storage chamber having a cylindrical shaped overflow trap secured thereto, said trap having an external cylindrical shoulder extension and an internal hollow rod member formed co-axial and integral with its base, the rod member being closed at one end and having an aperture in its side, the open end of said rod communicating with the co-axial shoulder extension, and an indicating chamber mounted upon and directly communicating with said storage chamber.

10. A liquid level indicating device comprising a cylindrical shaped storage chamber having attached to its base a cylindrical overflow trap, said trap being provided with a hollow threaded cylindrical shoulder extension, a hollow rod member formed integral with the base of said trap and vertically aligned with said hollow shoulder extension, and an indicating chamber mounted upon and communicating with the storage chamber.

11. A liquid level indicating device comprising a cylindrical storage chamber, a base for the chamber adapted to be detachably secured thereto, said base being formed on one side with a threaded cylindrical shoulder extension and on its opposite side with a centrally positioned rod member provided with a series of fluid passages, an overflow trap secured to said shoulder extension and communicating with one of said series, and an indicating chamber mounted upon the storage chamber and communicating with the other of said series.

12. A liquid level indicating device comprising a storage chamber containing a body of liquid, an indicating chamber mounted upon the storage chamber and through which liquid may be forced, said indicating chamber being formed with a solid central column, said column being provided with channels to conduct liquid from the storage chamber to the indicating chamber.

13. In a device of the class described, a cylindrical storage chamber adapted to be partially filled with a registering liquid subject to a source of pressure, a cylindrical indicating chamber mounted upon the storage chamber and into which the liquid may be forced to thereby register the amount of pressure, said indicating chamber being approximately equal in diameter and height to said storage chamber but of substantially less volumetric capacity.

14. A liquid level indicating device comprising a storage chamber and an indicating chamber, said indicating chamber comprising a solid central column and a transparent housing spaced from and enclosing the column, an expansion chamber mounted upon the indicating chamber, said expansion chamber communicating with the storage chamber through the indicating chamber.

15. A liquid level indicating device comprising a storage chamber, an indicating chamber mounted upon and communicating with the storage chamber, said indicating chamber comprising a solid central column channeled at each end, and a transparent housing spaced from and enclosing the column, an expansion chamber mounted upon the indicating chamber and communicating with the storage chamber through the said channeled and spaced portion of the indicating chamber.

16. A liquid level indicating device comprising an indicating chamber connected to a source of pressure and adapted to contain a liquid to register the change of pressure, said chamber having a transparent bakelite housing nesting a solid central column.

17. A liquid level indicating device comprising a storage chamber, an indicating chamber and an expansion chamber, said chambers being mounted in vertical alignment and communicating the one with the other, means to connect the storage chamber to a movable column of air to register the pressure in the body of liquid, and means mounted in the expansion chamber to discharge the air from the system.

18. A liquid level indicating device comprising a storage chamber containing a liquid adapted to be displaced by an air column, an indicating chamber into which the displaced liquid is forced, and an expansion chamber mounted upon the indicating chamber and provided with means to eject the liquid from the indicating chamber and renew the air column.

19. In combination with a liquid container, a liquid level indicating device and a storage chamber adapted to be partially filled with a pressure indicating liquid, a conduit extending from the liquid container to said chamber adapted to conduct a column of air movable in response to varying pressures in the container, an indicating chamber mounted co-axially upon the storage chamber and into which liquid from the storage chamber may be forced, an expansion chamber mounted on the indicating chamber and communicating therewith, said expansion chamber having a plunger to force the liquid from said indicating chamber and the air from said conduit.

20. In combination with a liquid container, a liquid level indicating device containing an indicating fluid, a conduit connecting said container and said liquid level indicating device adapted to transmit pressure from the container to the indicating device by means of a column of gas, and means carried by the indicating device to replenish the column of gas in the conduit.

21. A device of the class described comprising a liquid level indicator adapted to contain a body of liquid displaceable upwardly under the action of a movable column of air, and a pump embodied in the indicating device to replenish the said column.

22. A device of the class described, in combination with a liquid container, a liquid level indicating device adapted to contain a body of liquid displaceable under the action of a column of air movable in response to varying pressures in the container, and a plunger means coacting with the indicating device to displace the liquid downwardly and replenish the said air column.

23. A device of the class described, in combination with a liquid container, a liquid level indicating device connected by a conduit to the container and adapted to contain a body of liquid displaceable upwardly, a column of gas enclosed in said conduit and movable in response to varying pressures in the container, and means carried by the indicating device including a plunger and an air intake valve to replenish the air in the conduit.

24. A liquid level indicating device comprising a storage chamber and an indicating chamber mounted coaxially thereon, said storage chamber having a solid central column provided with a plurality of fluid conducting channels communicating with said indicating chamber.

In testimony whereof I affix my signature.

EDWIN K. NORTON.